Nov. 7, 1933.     A. D. FORBES     1,934,529
STABILITY CONTROL
Filed Jan. 14, 1933     2 Sheets-Sheet 1

WITNESSES:

INVENTOR
Allan D. Forbes.
BY
ATTORNEY

Nov. 7, 1933.  A. D. FORBES  1,934,529
STABILITY CONTROL
Filed Jan. 14, 1933   2 Sheets-Sheet 2

INVENTOR
Allan D. Forbes.
BY
W. R. Coley
ATTORNEY

Patented Nov. 7, 1933

1,934,529

UNITED STATES PATENT OFFICE 1,934,529

STABILITY CONTROL

Allan D. Forbes, Wilkinsburg, Pa., assignor to Westinghouse Electric & Manufacturing Company, East Pittsburgh, Pa., a corporation of Pennsylvania Application January 14, 1933. Serial No. 651,719

18 Claims. (Cl. 172—8)

My invention relates to stability indicating and controlling means, and more particularly to means for indicating and for automatically controlling the stability of a generator and a motor, or of one or more generators selectively interconnected with one or more motors.

It is an object of my invention to provide a simple and efficient means for controlling the stability of an alternator and the motor load connected thereto.

Another object of my invention is to automatically increase the stability of a motor interconnected with an alternator when there is a certain decrease in frequency of the alternator.

It is also an object of my invention to automatically increase the torque margin of a motor receiving energy from an alternator when the frequency of the alternator decreases a certain value.

Other objects and advantages will become apparent from the following specification and the claims appended thereto, when considered in conjunction with the accompanying drawings, in which:

I have found for a power system that when a substantially definite speed-load curve is followed, as in case of ship propulsion, the stability of the power system, which includes at least one generator and one motor, may be indicated by a device responsive both to the speed of the motor and the flux density in the magnetic circuits of the motor.

Figure 3:
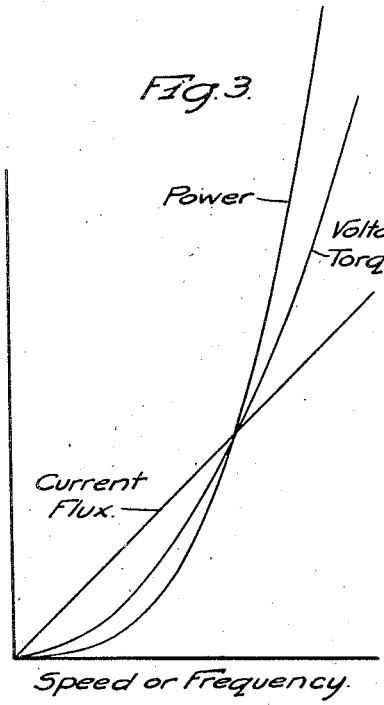
Fig. 3 is a showing of some of the operating curves of the units used in electric ship propulsion.

Fig. 3, for example, shows the power curve and other curves for ship propulsion. The power curve is very nearly a cubic curve and the torque curve is very nearly a parabola or a squared curve, as shown. Since it is theoretically desirable to maintain the ratio of current to flux constant, but if both increase directly with speed, both current and flux may be represented by a single straight line, as shown in Fig. 3. The torque furnished will then be the desired parabola and the power curve will be the desired cubic.

For proper ship operation, i. e., for a proper stable operation of the electric units, the generators and motors, it has been found that the speed, flux, and current should be kept proportional. The relation is, however, such that if speed and flux are held proportional the current must be proportional. An instrument devised to be responsive to the flux density in the motor and the speed of the motor will thus give an indication of the stability of operation of the motor and generator.

Furthermore, by a proper selection of control circuits and units associated with the instrument, the excitation of the generator or the motor or both may be automatically regulated to keep a constant stability of operation for the motor. That is, a synchronous motor will operate at a substantially fixed high percent of its pull-out torque for any frequency of the generator and similarly, an induction motor will operate at a substantially fixed point, relative to the pull-out torque, on the speed torque curve of the induction motor.

Figure 4:
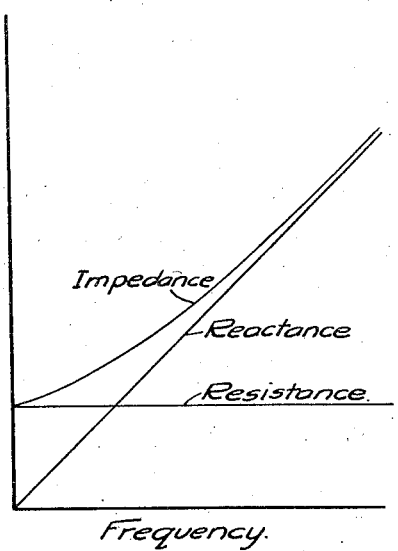
Fig. 4 is a showing of curves illustrating certain electrical characteristics of the stability control device.

During maneuvering there may be considerable changes in the torque demand and in consequence, a higher stability and in consequence a greater torque margin may be desirable. My invention automatically provides for such increased torque margin for the lower frequencies by a proper choice of values of inductance and resistance in the portion of the circuit of the stability instrument responsive to flux density. Fig. 4 shows how the reactance and in consequence the impedance of the circuit through the transformer secondary 37, resistor 39, coil 40 and reactor 41 varies with changes of frequency. If the voltage and frequency be decreased proportionally, it is apparent from the shape of the impedance curve that the current in coil 40 will decrease more and more rapidly as lower and lower frequencies are reached because the resistance value of resistor 39, if the value be properly chosen, relative to the characteristics of the remainder of the circuit, may become a comparatively large part of the total impedance in the circuit including coil 40. The generator and motor excitations, as will be pointed out more in detail hereinafter, may be increased relative to the frequency of the generator with the result that the torque margin is increased, i. e., the motor is operated at a higher stability. The torque margin is the percent difference between the pull-out torque and the torque of the propeller driving motor.

Figure 1:
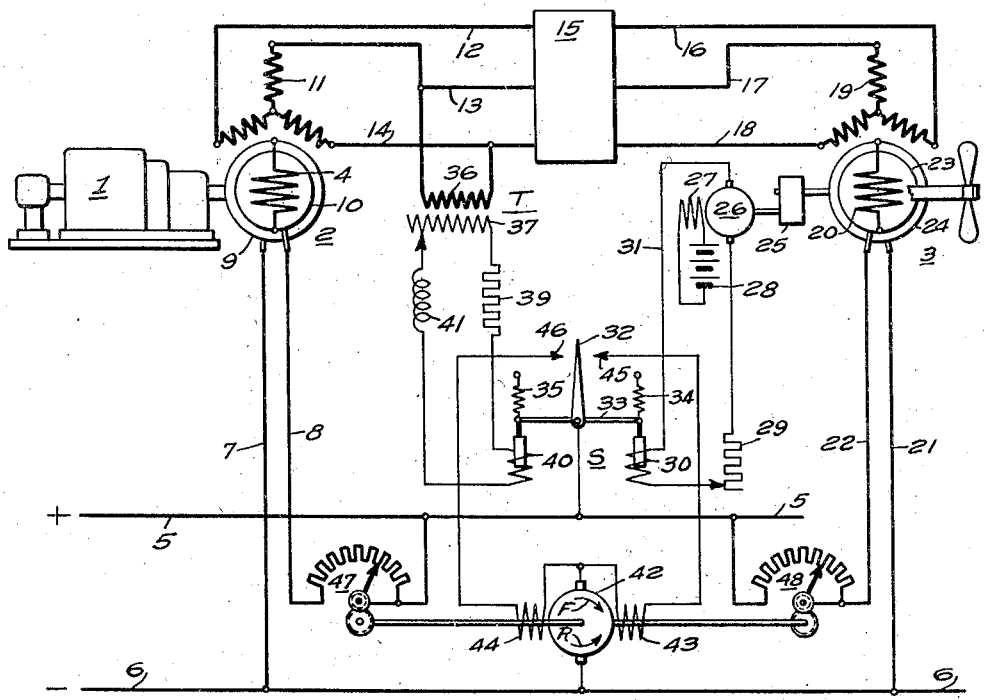
Figure 1 shows diagrammatically, means for automatically controlling the excitation of both a generator and a synchronous motor connected to maintain substantially constant stability over a certain range.

Referring more particularly to Fig. 1 of the drawings, the reference character 1 designates a variable speed prime mover which is schematically shown as a turbine. The speed of the turbine may be varied by the variation of the admission of steam to suit operating conditions of the system. A synchronous generator or alternator 2 is directly coupled to the turbine and in consequence, generates an alternating current having a frequency determined by the speed of the turbine. The generator is provided with a rotating field winding 4 which is connected to the slip rings 9 and 10 which are suitably energized from a source of direct current 5 and 6 through conductors 7 and 8, connected to the source of direct current 5 and 6 through rheostat 47.

A propeller driving motor 3 is electrically connected to the generator by the reversing switches whereby the direction of rotation of the propeller driving motor may be selected at will. To effect the inter-connection between the generator and the motor, conductors 12, 13 and 14 are connected to the armature winding 11 of the generator and conductors 16, 17 and 18 connect the armature 19 of the motor to the armature of the generator through the reversing switch 15. The motor is shown as a synchronous motor and is thus provided with a field winding 20 connected to slip rings 23 and 24 which are suitably energized from the source of direct current 5 and 6 through rheostat 48 and conductors 21 and 22.

As shown, the rheostats 47 and 48 are motor-operated and in order that the field current in both the motor as well as the generator may be raised or lowered the motor 42 is coupled to the respective rheostats and has two field windings 43 and 44 whereby the motor 42 may be caused to operate in one or the other direction by the stability controlling device as described more in detail hereinafter.

Mechanically coupled to the synchronous motor 3 through suitable gearing 25, or if desired directly, is a generator 26 which is separately excited from the source of direct-current energy 28. Since the field winding 27 is coupled to a source of energy having a constant voltage, the generator 26 will deliver a voltage directly proportional to the speed of the synchronous motor 3. The generator 26 need not necessarily be of the type shown but may be a small magneto or generator, the field of which is a permanent magnet. It is essential, though, that the voltage of the generator 26 be primarily directly proportional to the speed of the propeller driving motor 3.

To properly control the stability of the motor 3, a stability control device is provided which includes a lever 33 held in a given balanced position by a pair of springs 34 and 35. The lever is also provided with a pair of armatures which are disposed to be acted upon by solenoids or coils 30 and 40, respectively. Coil 30 is connected directly in circuit relation with the armature of generator 26 through resistor 29 and conductor 31. It is thus obvious that the current in coil 30 will be a direct function of the voltage of the generator 26.

The coil 40 is connected in series-circuit relation with the secondary 37 of transformer T, resistor 39 and reactor 41. For purposes of adjustment, the connection of the reactor to the secondary of the transformer is shown to be adjustable. The transformer T has its primary winding 36 connected to conductors 13 and 14.

The reactance of reactor 41 is so chosen that the current passing through coil 40 will be proportional to the voltage of the generator divided by the frequency, that is, the effect of the coil 40 will be a direct function to the flux density in the generator 2 and motor 3. However, for purposes of discussion, it is apparent that the constants of the elements in the circuit of the coil may be so chosen that the effect of coil 40 will be a direct function of either the flux density in the generator 2 or the flux density in the motor 3, depending upon the adjustment and the constants referred to. More accurately expressed, the force exerted by coil 40 on the armature associated therewith is a direct function of the ratio of $E$ to $f$, where $E$ is the voltage of the generator and $f$ is the frequency of the current supplied to the motor 3.

As heretofore explained, the effect of coil 30 upon the armature associated therewith is substantially directly proportional to the speed of the motor 3. It is, therefore, obvious that the position of pointer 32 will be a function of the ratio of $E$ to $f \times s$, where $s$ is the speed of the propeller driving motor 3. But, as has already been explained, the ratio just referred to has been found to be a very excellent indication of the stability of operation of the propeller driving motor. The stability controlling device S is thus responsive to the stability of operation of the system and can be utilized to control the excitation of either the generator or of the motor, or both, to maintain a substantially constant stability over a considerable range of operating speed.

Assuming for the moment that a constant voltage is applied to the motor and that the frequency is to be varied, then for a given angular rotor displacement the current in the generator and motor circuits will not increase in inverse proportion as the frequency is lowered because of the increasing importance of the motor resistance relative to the reactance at the low frequencies. If now the voltage be decreased along the parabola shown in Fig. 3, then the current would be even less, than the value given by the straight line, at the low frequencies. For this reason the necessary torque would not be developed at this angular displacement and the angle would increase thus decreasing the stability or possibly even pulling the motor out of step.

Accordingly, resistor 39 is inserted in the circuit of the coil 40 so that the resistance of the resistor 39 for the lower frequencies may also be a considerable portion of the impedance drop in that circuit. The result is that the current in coil 40 may tend to drop more rapidly for the lower frequencies than for the higher frequencies, whereby the pointer 32 is automatically moved in a clockwise direction to effect a somewhat greater excitation relative to the frequency in either one or both of the dynamo-electric machines 2 and 3.

A better understanding of my invention can probably be had by a study of the operation of the system. If it be assumed that for some cause the torque on the motor 3 increases so that there be a tendency of the motor to operate more nearly at its pull-out torque, the stability does not remain constant and in fact, the motor is less likely to be stable. With an increase of torque the rotor displacement relative to the rotating field becomes greater with the result that the voltage of generator 26 decreases proportionally to the increase in the angular displacement of the rotor. The design of device S is such that the effect of coil 30 is thus less than the effect of coil 40 and the pointer moves in the clockwise direction and makes contact at 45, thereby establishing a circuit from the positive bus 5 through pointer 32, contact member 45, field winding 43 and motor 42 to the negative bus 6. The motor 42 will thus rotate in the direction indicated by the arrow F. Rotation of the motor in the direction indicated, being the clockwise direction, rotates the arms of the rheostats 47 and 48 in a counter-clockwise direction, with the result that more and more resistor sections of the rheostats are taken out of the field circuits for the field windings 4 and 20 of the generator 2 and the motor 3, respectively. The excitation of the two dynamo-electric machines being thus increased, their tendency to remain in step is much increased. This is readily apparent from the fact that an increased excitation of either one or both machines increases the pull-out torque of the motor 2.

If the operation of the motor 3, for any reason, is more stable than desired, the effect of coil 30 will exceed the effect of coil 40 and an energizing circuit will be established from the conductor 5 through pointer 32, contact member 46, field winding 44 and motor 42 to the negative conductor 6. The motor 42 will thus operate in a counter-clockwise direction or as indicated by the arrow R, and as a result, more and more resistor sections of the respective rheostats 47 and 48 will be inserted in the circuits of the field windings 4 and 20, respectively. And again the stability will be maintained substantially constant.

The stability will be maintained constant over a considerable range of speed of the prime mover 1, however, for the lower frequencies of the generator 2, the effect of resistor 39 becomes relatively more important with the result that less current passes through coil 40 than through coil 30. The stability control device is thus operated to increase the excitation of both the generator and the motor to thereby operate at a greater stability and in consequence, at a much greater torque margin. By a suitable design of the generator 26 so that its voltage does not decrease directly with the speed, that is, decreases less rapidly with speed of the motor 3, the stability control device may be utilized to automatically very materially increase the torque of the motor 3.

Figure 2:
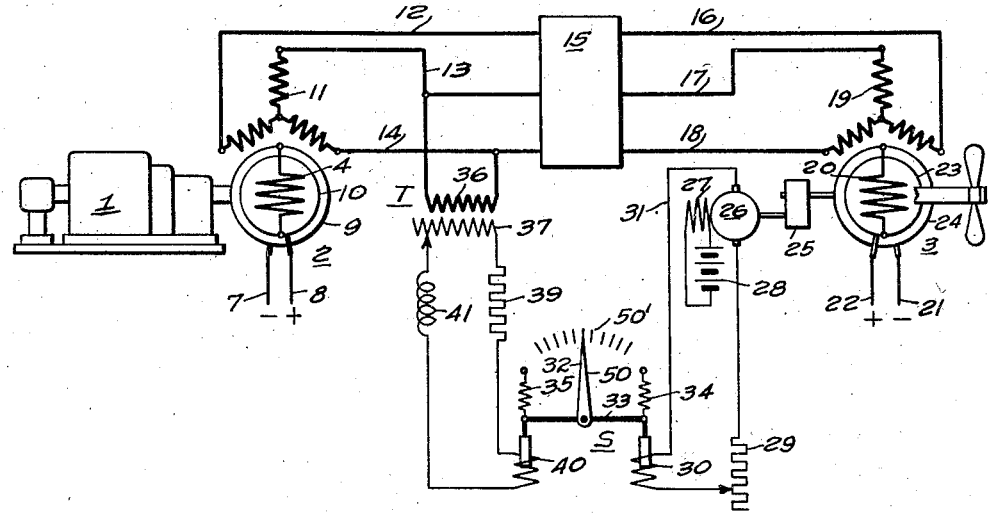
Fig. 2 shows, diagrammatically, an arrangement similar to that shown in Fig. 1 except that stability is merely indicated and the necessary or desirable control may be effected by manually controlled means.

Fig. 2 shows substantially the same subject matter as Fig. 1 except that it represents a system considerably cheaper. In this last system, the stability control device is no more than a control for an indicator 50 cooperating with scale 50' to indicate constant stability, and the attendant must manipulate the rheostats for either the generator or the motor, or both, to increase, or decrease the stability, or as is more often the desired operation, to maintain the stability constant.

Figure 5:
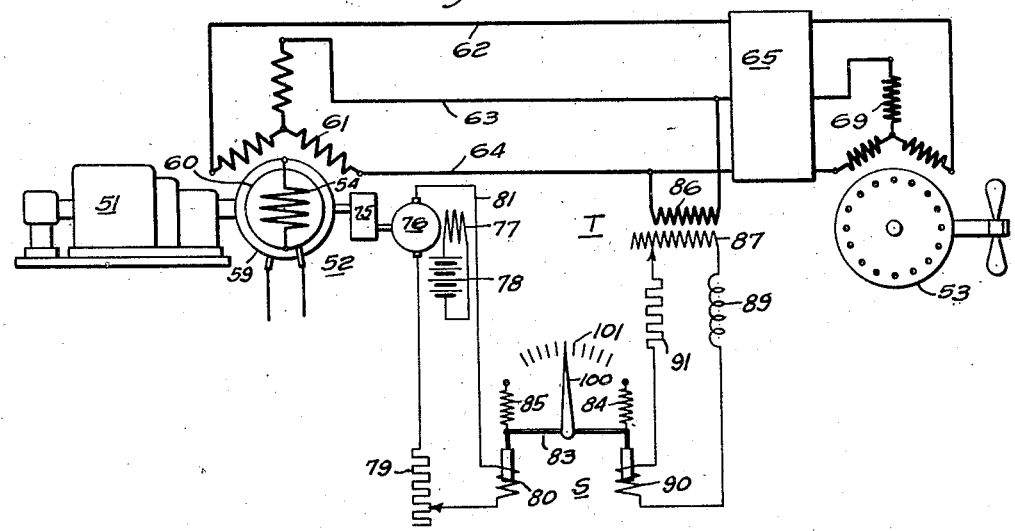
Fig. 5 shows, diagrammatically, a modification of the stability control devices used in conjunction with a generator driving an induction motor.

Fig. 5 is a further modification of my invention and embodies the variable speed prime mover 51, driving a synchronous generator 52. This synchronous generator is provided with a field winding 54 connected to the slip rings 59 and 60 which are in turn suitably energized through a control rheostat from a source of direct current power not shown. The armature winding 61 of the generator is connected to the armature winding 69 of the motor through conductors 62, 63 and 64, through a suitable reversing switch 65. The motor 53 may be either a wound rotor, an ordinary squirrel-cage motor, or a double squirrel-cage motor.

In this last modification, the speed responsive generator 76 is connected through suitable gearing 75 to the shaft of the generator. The field winding 77 is energized from a battery 78. The generator is thus designed to deliver a voltage proportional to the speed of the generator. Coil 80 of the stability control device S is connected in series-circuit relation to resistor 79, armature 76 and conductor 81. The stability control device has a balanced arm 83 held in a given position by a pair of springs 84 and 85 and a pointer 100 secured to the bar 83 cooperates with a scale 101. Coil 90 is inter-connected with the resistor 91, the secondary 87 of transformer T, and reactor 89. The transformer primary 86 receives its energy from conductors 63 and 64. The function of the stability control device is similar in every respect to the function outlined heretofore in connection with the discussion of the modification shown in Fig. 1.

It is to be understood that the herein described modifications are merely illustrative of my invention and that other circuit arrangements may be readily devised by those skilled in the art once they have had the benefit of the teachings of my invention to accomplish the results heretofore specified, and hereinafter claimed.

I claim as my invention:

1. An electric power system such as is utilized in electric ship propulsion comprising a variable voltage and variable frequency dynamo-electric machine and a propeller driving dynamo-electric machine disposed to be connected to the first-named machine, in combination with stability responsive means, said means including a pair of coils arranged to produce opposing effects, one of said coils being connected to be responsive substantially to the ratio of the voltage of the first-named machine to the frequency of the first-named machine, and the other of said coils being connected to be responsive to the speed of one of said machines.

2. An electric power system including a pair of variable speed dynamo-electric machines, in combination with stability responsive means, said means including a pair of coils arranged to produce opposing effects, one of said coils being connected to be responsive substantially to the ratio of the voltage of one of said machines to the frequency of said machine, and the other of said coils being connected to be responsive to the speed of one of said machines.

3. An electric power system including a variable speed alternator arranged to supply alternating current of variable frequency to a work motor, in combination with stability responsive means including a pair of coils arranged to produce opposing effects and connected to be responsive to the flux density in the alternator and the speed of the work motor, respectively.

4. An electric power system including a pair of variable speed dynamo-electric machines, in combination with stability responsive means including a pair of coils arranged to produce opposing effects and connected to be responsive substantially to the flux density in said machines and the speed of one of said machines, respectively.

5. In the method of operating an electrically propelled ship having a variable speed variable voltage alternator, connected to operate a propeller driving motor which includes maintaining a predetermined ratio between the motor speed and the flux density thereby maintaining the alternator and motor excitation in such conditions that there will be a selected stable operation for the motor and alternator.

6. In the method of operating an electrically propelled ship having a variable frequency variable voltage alternator and a propeller driving motor connected to the alternator, which includes measuring the ratio of the voltage to the frequency of the alternator, comparing this ratio to the speed of the motor, and by virtue of such acts controlling the excitation of the alternator to provide stable operation for the alternator and motor.

7. In the method of operating an electrically propelled ship having a variable voltage variable frequency alternator and a propeller driving motor connected thereto, which includes measuring the flux density in the alternator and motor, comparing said density with the speed of either the alternator or the motor and by virtue of said comparison varying both the excitations of the alternator and motor to provide stable operation of said alternator and motor.

8. In an electric ship propulsion system comprising a synchronous generator, a variable speed prime mover for driving the generator, and a propeller driving motor connected to the generator, in combination, with means responsive directly to the voltage of the generator and inversely to the frequency of the current supplied to the motor, balancing means responsive to the speed of the motor for normally balancing the force of said first-named means, a motor, responsive to an unbalance between the forces of said two means, for varying the excitation of both the generator and motor to maintain a selected stable operation for the system.

9. In an alternating current system comprising energizing means and translating means having various operating relations to the energizing means, in combination, with means for indicating the stability of the energizing means and the translating means, said indicating means including means substantially responsive to the ratio of two operating characteristics of the energizing means and responsive to a certain characteristic of the translating means.

10. In an electric power system, an adjustable speed synchronous generator, a variable speed prime mover for driving the generator, an alternating-current load-driving motor disposed to be connected to the generator, means for simultaneously regulating the excitation of both the motor and the generator, a motor for driving said regulating means, means responsive to the ratio of the voltage of the generator to the product of the frequency of the generator and the speed of the motor, for controlling the direction of rotation of the motor driving said regulating means.

11. In an electric power system including a source of alternating current, the frequency and voltage of which may be varied, a motor supplied thereby, in combination with means responsive to the magnetic condition in the motor and the speed of the motor for indicating the degree of stability of the motor.

12. In an electric power system, such as utilized on board ship for electric ship propulsion, and including a variable speed prime mover, a synchronous generator driven at various speeds by said prime mover to thus generate energy of varying frequency, means for varying the excitation of the generator, electro-magnetic means responsive to the magnetic condition of the motor, balancing means, responsive to the speed of the motor, disposed to normally balance the effect of said electro-magnetic means, and means responsive to an unbalance of the effects of said electro-magnetic and balance means adapted to control the excitation varying means of said generator.

13. In an electric system, a source of alternating current, the voltage and frequency of which may be varied, a motor connected to said source, means for automatically increasing the flux density of the motor as the frequency of the source of energy is decreased, and means responsive to the ratio of the flux density of the motor to the speed of the motor to control the voltage of said source of alternating current.

14. In an electric system, a synchronous generator the voltage and frequency of which may be varied, a motor connected to the generator, in combination with means for automatically increasing the relative stability of the generator and motor with a decrease in frequency.

15. In an electric system including a synchronous generator, means for varying the excitation of the generator, means for driving the generator at various speeds to vary the frequency thereof, a motor connected to the generator, means for automatically increasing the excitation relative to the frequency of the generator with a decrease in frequency, means responsive to the speed of the motor, motor flux density responsive means, and means responsive to the relative effect of said flux density responsive means and the speed responsive means for controlling the excitation of the motor and generator to maintain a selected stable operation of the motor and generator, and to increase the torque margin of the motor for the lower frequencies.

16. In an electric power system comprising a synchronous generator, a variable speed prime mover for driving the generator to vary the frequency of the energy delivered by the generator, means for varying the excitation of the generator, and means substantially responsive to the quantity $\frac{E}{fs}$ for controlling the stability of the motor by controlling the means for varying the excitation of the generator, where E is the voltage of the generator, $f$ the frequency of the current supplied to the motor by the generator, and $s$ is the speed of the motor.

17. In an electric power system comprising a dynamo-electric machine, a variable speed prime mover for driving the machine, a second dynamo-electric machine disposed to receive energy from the first machine, excitation control means for varying the excitation of one of said machines, and stability control means for controlling the stability of said second machine by controlling the excitation control means, said stability control means being substantially responsive to the quantity $\frac{E}{fs}$, where E is the voltage of the first-named machine, $f$ the frequency of the current supplied to the second-named machine, and $s$ is the speed of the second-named machine.

18. In an electric power system comprising two dynamo-electric machines, means for driving one machine, interconnecting means between said machines whereby the other machine receives energy from the driven machine, means for indicating the stability of the machines, said indicating means being responsive substantially to the quantity $\frac{E}{fs}$, where E and $f$ are the voltage and frequency, respectively, of the driven machine and $s$ is the speed of one of said machines.

ALLAN D. FORBES.